United States Patent
Iwayama (10) Patent No.: US 11,338,439 B2
(45) Date of Patent: May 24, 2022

(54) ROBOT CONTROL METHOD

(71) Applicant: FANUC CORPORATION, Yamanashi (JP)

(72) Inventor: Takatoshi Iwayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 305 days.

(21) Appl. No.: 16/585,820

(22) Filed: Sep. 27, 2019

(65) Prior Publication Data
US 2020/0130187 A1    Apr. 30, 2020

(30) Foreign Application Priority Data
Oct. 24, 2018    (JP) .............................. JP2018-199860

(51) Int. Cl.
*B25J 9/16*    (2006.01)
*B25J 19/02*    (2006.01)

(52) U.S. Cl.
CPC ........... *B25J 9/1676* (2013.01); *B25J 9/1633* (2013.01); *B25J 19/02* (2013.01); *G05B 2219/40203* (2013.01)

(58) Field of Classification Search
CPC ........ B25J 9/1676; B25J 19/02; B25J 9/1633; B25J 9/0081; B25J 9/1602; B25J 9/1656;
(Continued)

(56) References Cited

U.S. PATENT DOCUMENTS 5,485,389 A    1/1996  Terada et al.
8,527,191 B2 *  9/2013 Van Den Berg ......... A01K 1/01
                                                   250/341.8
(Continued)

FOREIGN PATENT DOCUMENTS

DE   102016200455 A1   7/2017
EP         0601199 A1   6/1994
(Continued)

OTHER PUBLICATIONS

Japanese Notice of Reasons for Refusal dated Dec. 1, 2020, for Japanese Patent Application No. 2018199860.
(Continued)

*Primary Examiner* — B M M Hannan
(74) *Attorney, Agent, or Firm* — Karceski IP Law, PLLC (57) ABSTRACT

A robot control method includes, storing, in a memory, shape information about a robot including a tool attached to a tip and about a peripheral object located on a periphery of the robot. A teaching program also is stored in the memory. The teaching program includes a setting speed when operating the robot. By a processor connected to the memory, a distance between the robot and the peripheral object, based on the shape information, is calculated at each operation position when operating the robot according to the teaching program. By the processor, it is determined whether or not the calculated distance is changing in a decreasing direction. In response to determining that the calculated distance is changing in the decreasing direction, by the processor, the robot is operated at a speed lower than the setting speed in the teaching program.

9 Claims, 7 Drawing Sheets

(58) Field of Classification Search
CPC ........... G05B 2219/40203; G05B 2219/40202; G05B 2219/40201
USPC .......................................... 700/245, 255, 260
See application file for complete search history.

(56) References Cited

U.S. PATENT DOCUMENTS

| | | | |
|---|---|---|---|
| 2005/0143861 A1* | 6/2005 | Watanabe | B25J 9/1684 |
| | | | 700/264 |
| 2009/0105880 A1 | 4/2009 | Okazaki | |
| 2011/0010009 A1* | 1/2011 | Saito | B25J 9/1612 |
| | | | 700/253 |
| 2011/0306985 A1 | 12/2011 | Inoue et al. | |
| 2012/0327190 A1* | 12/2012 | Massanell | B25J 9/1676 |
| | | | 348/46 |
| 2014/0067121 A1* | 3/2014 | Brooks | B25J 9/1676 |
| | | | 700/255 |
| 2015/0306767 A1 | 10/2015 | Saito | |
| 2017/0326734 A1 | 11/2017 | Iida et al. | |
| 2018/0093378 A1 | 4/2018 | Yamamoto et al. | |
| 2018/0222050 A1* | 8/2018 | Vu | B25J 9/1676 |
| 2018/0297204 A1* | 10/2018 | Kras | B25J 9/163 |
| 2018/0311814 A1* | 11/2018 | Kamisono | G05B 19/423 |
| 2020/0238538 A1 | 7/2020 | Iida et al. | |

FOREIGN PATENT DOCUMENTS

| | | |
|---|---|---|
| EP | 1901150 A1 | 3/2008 |
| EP | 2939797 A2 | 11/2015 |
| JP | S61105594 U | 7/1986 |
| JP | H05345286 A | 12/1993 |
| JP | 2009090400 A | 4/2009 |
| JP | 2011125975 A | 6/2011 |
| JP | 2011254975 A | 12/2011 |
| JP | 2012223831 A | 11/2012 |
| JP | 2014161965 A | 9/2014 |
| JP | 2015208789 A | 11/2015 |
| JP | 2017205858 A | 11/2017 |
| JP | 2018051734 A | 4/2018 |
| WO | 2007080733 A1 | 7/2007 |
| WO | 2018092860 A1 | 5/2018 |
| WO | 2018190936 A1 | 10/2018 |

OTHER PUBLICATIONS

Japanese Search Report by Registered Search Organization dated Oct. 28, 2020, for Japanese Patent Application No. 2018199860.

* cited by examiner

ROBOT CONTROL METHOD

CROSS-REFERENCE TO RELATED APPLICATIONS

This application claims priority to and the benefit of Japanese Patent Application No. 2018-199860, filed on Oct. 24, 2018, the entire content of which is incorporated herein by reference.

FIELD OF THE INVENTION

The present invention relates to a robot control method.

BACKGROUND OF THE INVENTION

Conventionally, there has been known a system that detects an operator when the operator enters a workspace where a robot is working, and calculates the distance between the operator and the robot and decreases the operating speed of the robot as the distance between the operator and the robot becomes shorter (see, for example, Japanese Unexamined Patent Application, Publication No. 2012-223831).

Meanwhile, in a system including a robot, when the robot is approaching a peripheral object other than the operator, such as when the robot is going to grip a workpiece, the operating speed of the robot needs to be decreased, regardless of the presence of an operator, to eliminate the risk of trapping a part of the operator between the robot and the peripheral object.

SUMMARY OF THE INVENTION

One aspect of the present invention is a robot control method including: storing at least a part of shape information about a robot including a tool attached to a tip and about a peripheral object located on a periphery of the robot; calculating a change in a distance between the robot and the peripheral object, based on the shape information, at each operation position when operating the robot according to a teaching program; and performing control to decrease a speed set in the teaching program only if the calculated distance is changing in a decreasing direction.

Another aspect of the present invention is a robot control method including: storing at least a part of shape information about a robot including a tool attached to a tip and about a peripheral object located on a periphery of the robot; calculating a change in a distance between the robot and the peripheral object, based on the shape information, at each operation position when causing the robot to perform a jog operation; and performing control to decrease a speed of the jog operation only if the calculated distance is changing in a decreasing direction.

Yet another aspect of the present invention is a robot control method including: storing at least a part of shape information about a robot including a tool attached to a tip; calculating a change in a distance between portions of the robot itself, based on the shape information, at each operation position when operating the robot according to a teaching program; and performing control to decrease a speed set in the teaching program only if the calculated distance is changing in a decreasing direction.

DESCRIPTION OF EMBODIMENT(S) OF THE INVENTION

A control method of a collaborative robot according to one embodiment of the present invention will be described hereinafter with reference to the drawings.

Figure 1:
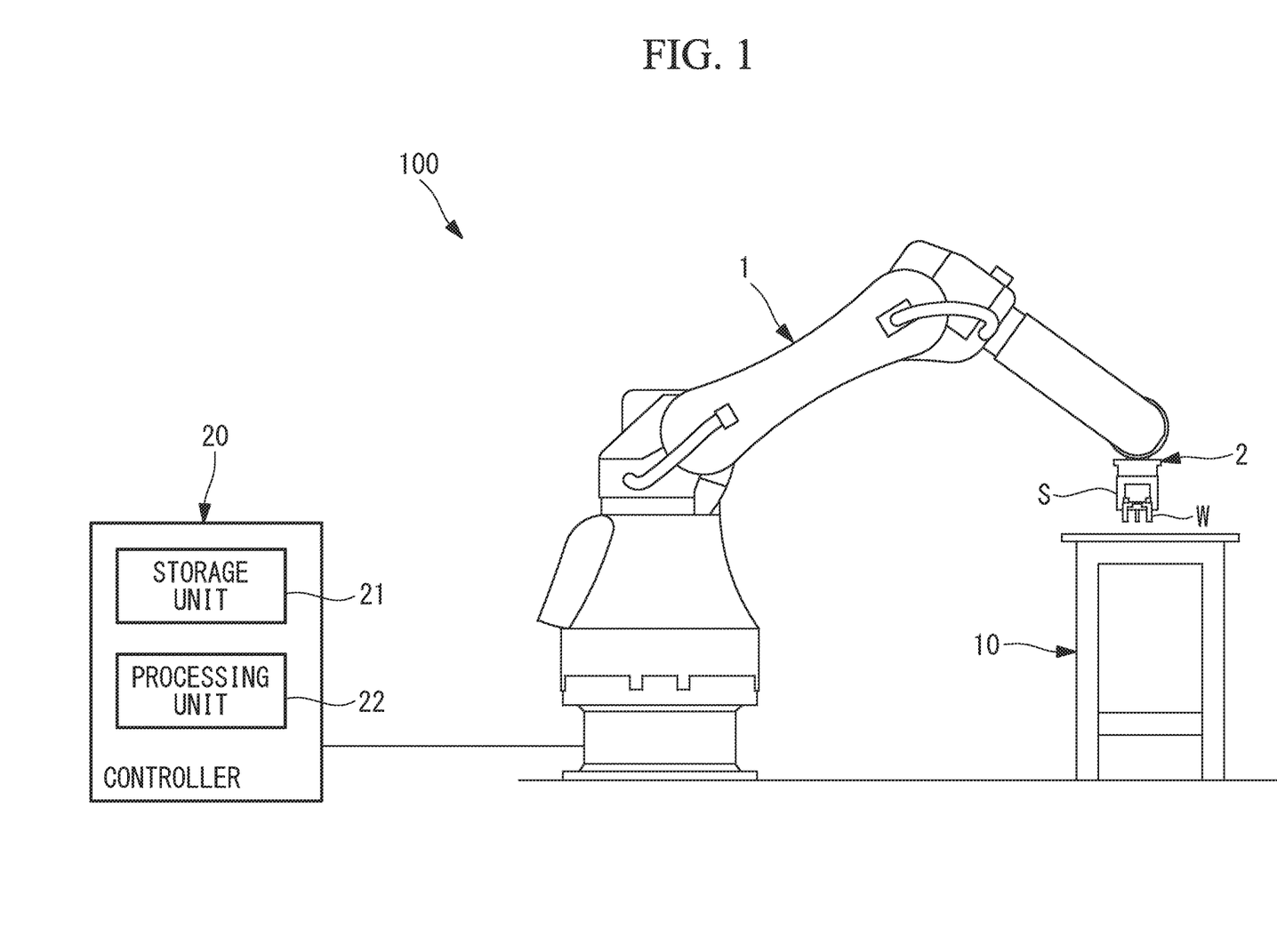
FIG. 1 is an overall structural view showing a robot system that implements a control method of a collaborative robot according to one embodiment of the present invention.

The control method of a collaborative robot 1 according to the present embodiment is implemented by a robot system 100 shown in FIG. 1.

As shown in FIG. 1, the robot system 100 includes the corroborative robot (robot) 1, a peripheral object 10 installed on the periphery of the collaborative robot 1, and a controller 20 that controls the collaborative robot 1.

The collaborative robot 1 is, for example, a six-axis articulated type robot. The collaborative robot 1 has a tool S for processing a workpiece W, the tool S being fixed at the tip of the collaborative robot 1. The tool S is, for example, a hand 2 that grips the workpiece W, or a tool that performs an arbitrary task on the workpiece W. The peripheral object 10 is, for example, a table on which the workpiece W to be processed by the collaborative robot 1 is placed, or a machine tool for processing the workpiece W.

The controller 20 includes a storage unit 21, which stores a teaching program taught in advance and shape information, and a processing unit 22 which executes the teaching program read from the storage unit 21. The storage unit 21 is a memory, and the processing unit 22 is a processor.

The teaching program stores coordinates of a plurality of teaching points taught by manually operating the collaborative robot 1 or offline, an operation sequence of the teaching points, a moving speed between the teaching points, an operation method between the teaching points, etc. When executing the teaching program, in principle, the processing unit 22 operates the collaborative robot 1 from one teaching point to another teaching point according to the operation sequence at the operating speed and with the operation method stored. The operation method may include linear interpolation or circular interpolation.

The shape information stored in the storage unit 21 is shape models of the collaborative robot 1 including the tool S at the tip and of the peripheral object 10. As the shape information, two-dimensional shape information may be adopted, or three-dimensional shape information may be adopted. Based on the shape information stored in the storage unit 21, the processing unit 22 calculates a distance L between the collaborative robot 1 and the peripheral object 10 at each teaching point set in the teaching program, or at each position on the locus of motion, such as each interpolation point between the teaching points.

Figure 2:
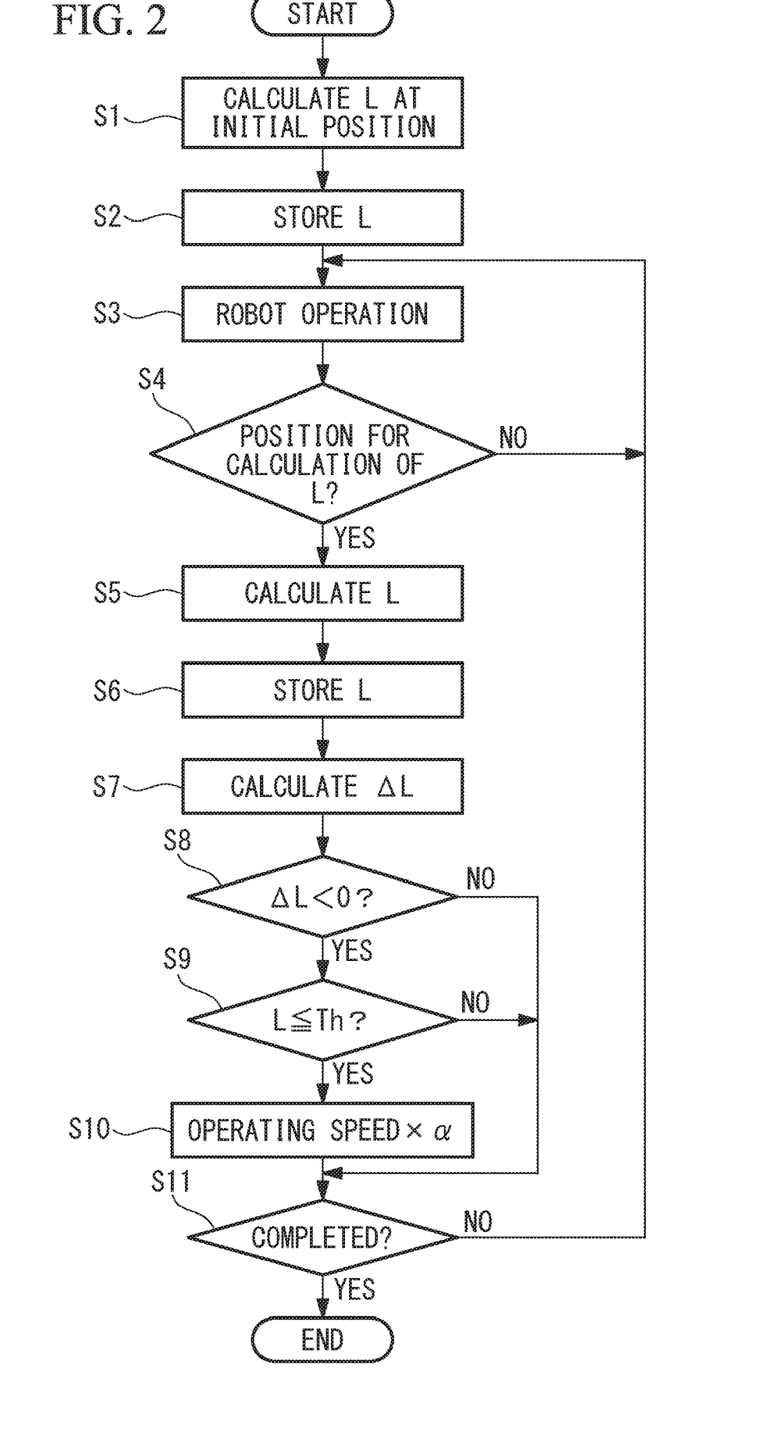
FIG. 2 is a flowchart showing the control method of the collaborative robot of FIG. 1.

That is, as shown in FIG. 2, first, at an initial position of the collaborative robot 1, the processing unit 22 reads out the shape information stored in the storage unit 21, and calculates the distance L between the collaborative robot 1 and the peripheral object 10 (step S1). The initial position may be a position immediately before the collaborative robot 1 starts to operate. The calculation of the distance L is performed between a plurality of preset measurement points on an outer surface of the collaborative robot 1 including the tool S and a plurality of preset measurement points on an outer surface of the peripheral object 10. The calculated distance L is stored in the storage unit 21 (step S2).

Next, the processing unit 22 operates the collaborative robot 1 according to the teaching program (step S3), determines whether or not the position is for calculating the distance L (step S4), and repeats the process from step S3 if determined that the position is not for calculating the distance L. If it is determined that the position is for calculating the distance L, the processing unit 22 reads out the shape information stored in the storage unit 21, and calculates the distance L between the collaborative robot 1 and the peripheral object 10 (step S5). For example, although the shape of the peripheral object 10 does not change, the shape of the collaborative robot 1 changes according to the position of each axis of the collaborative robot 1.

The processing unit 22 calculates the shape of the collaborative robot 1 at each position, based on the stored shape information, and calculates the distance L between a plurality of measurement points of the collaborative robot 1 and the peripheral object 10. Then, the calculated distance L between the measurement points is stored in the storage unit 21 (step S6), a change amount $\Delta L$ relative to the immediately preceding distance L stored in the storage unit 21 is calculated (step S7), and a determination is made as to whether the sign of the change amount $\Delta L$ is negative (step S8).

Figure 3:
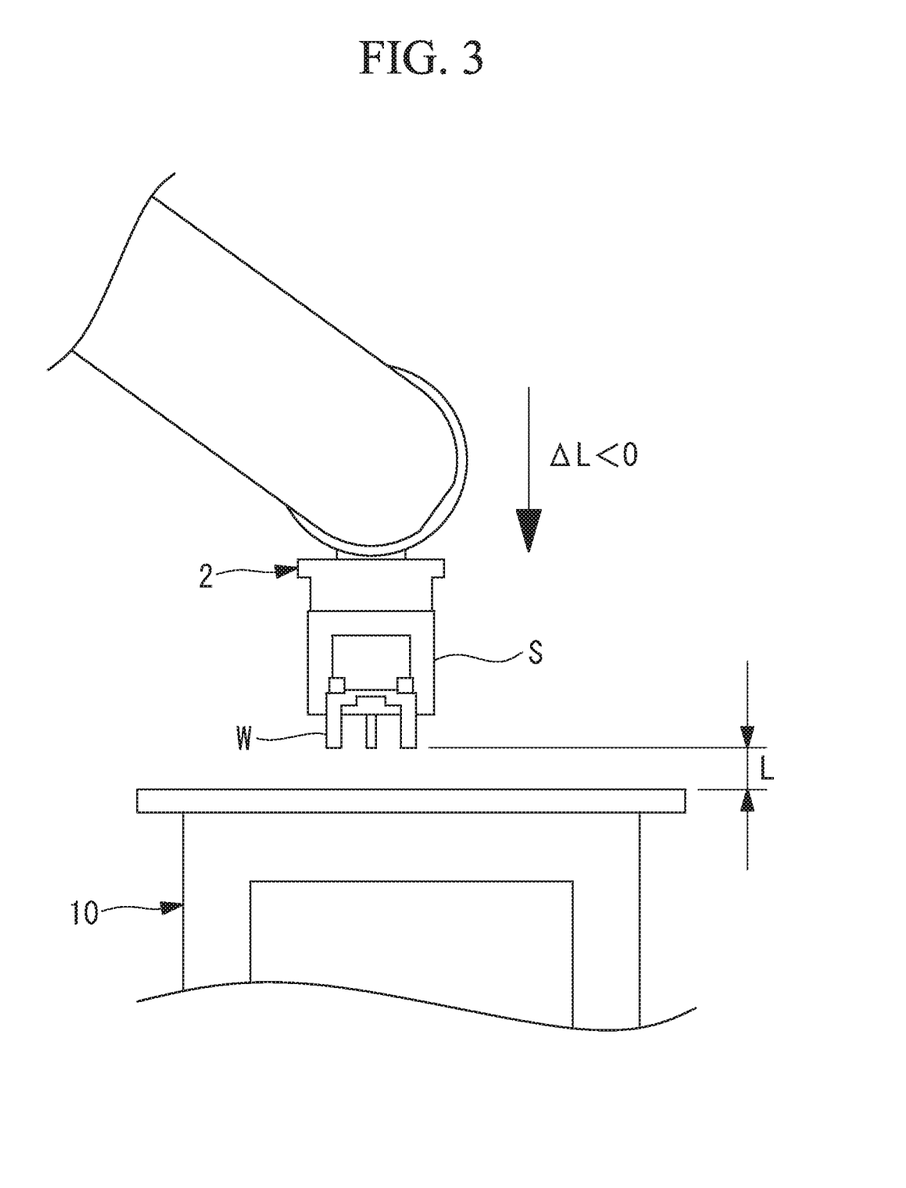
FIG. 3 is an enlarged front view of the robot system of FIG. 1 when the distance between the collaborative robot and a peripheral object is changing in a decreasing direction.

As shown in FIG. 3, if there is a measurement point pair where the distance L is changing in a decreasing direction, a determination is made as to whether the distance L between the measurement points is equal to or less than a predetermined threshold Th (step S9). Then, if the distance L of the measurement point pair is equal to or less than the predetermined threshold Th, the processing unit 22 multiplies the operating speed set in the teaching program by a constant $\alpha$ which is smaller than 1, and operates the collaborative robot 1. That is, the collaborative robot 1 is operated at an operating speed lower than the operating speed set in the teaching program (step S10).

Further, if there is a measurement point pair where the distance L is changing in an increasing direction in step S8, and if the distance L of the measurement point pair is larger than the predetermined threshold Th in step S9, a later-described process of step S11 is executed.

The constant $\alpha$ that is multiplied by the processing unit 22 may be selected according to the magnitude of the distance L between the measurement points. That is, when the distance L between the collaborative robot 1 and the peripheral object 10 is becoming shorter, the operating speed may be largely decreased by reducing the constant $\alpha$ of multiplication as the distance L becomes shorter.

Then, a determination is made as to whether or not the operation has been completed (step S11), and, if not completed, the process from step S3 is repeated.

Thus, according to the control method of the collaborative robot 1 of the present embodiment, the distance between each measurement point of the collaborative robot 1 and each measurement point of the peripheral object 10 is calculated at each operation position of the collaborative robot 1, and the operating speed of the collaborative robot 1 is limited if the collaborative robot 1 has approached closer to the peripheral object 10 until the distance L is equal to or less than the predetermined threshold Th and the distance L is changing in a decreasing direction.

Figure 4:
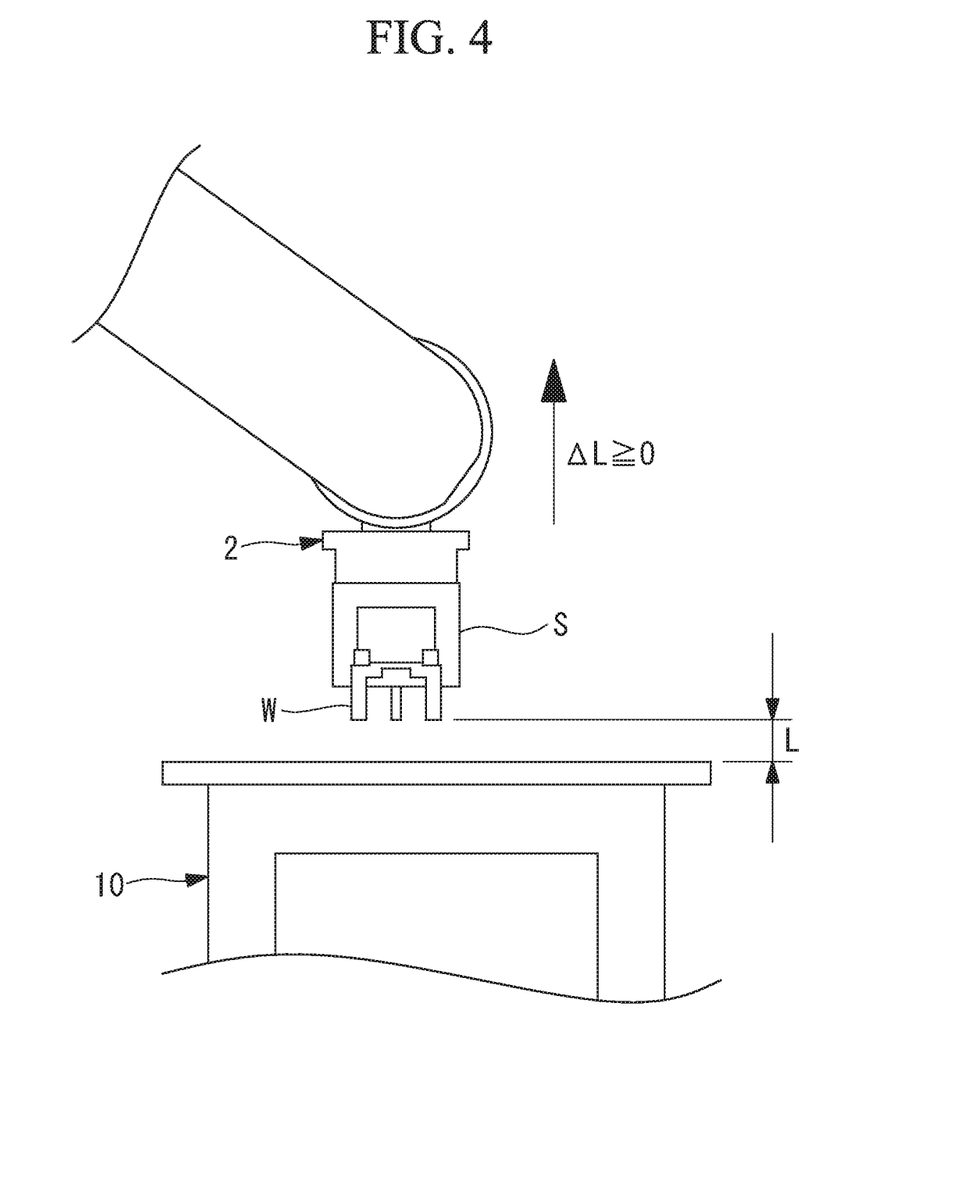
FIG. 4 is an enlarged front view of the robot system of FIG. 1 when the distance between the collaborative robot and the peripheral object is changing in an increasing direction.
Figure 5:
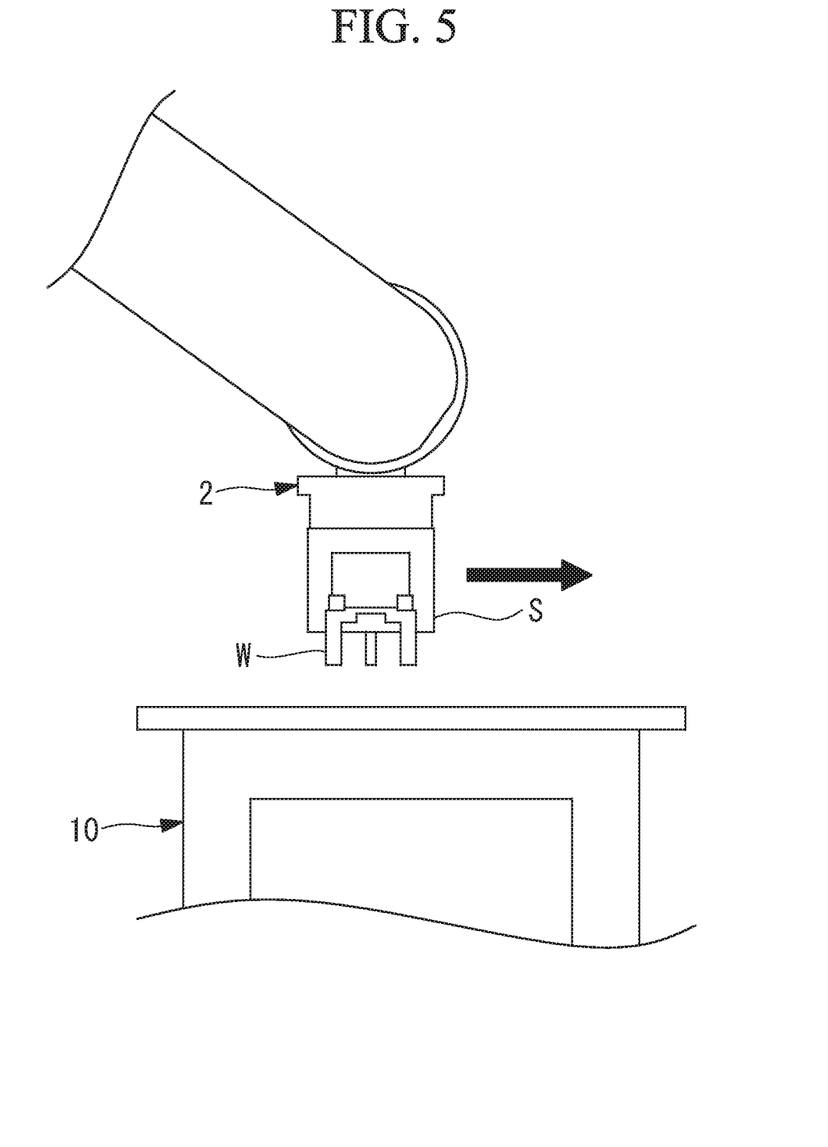
FIG. 5 is an enlarged front view of the robot system of FIG. 1 when the distance between the collaborative robot and the peripheral object is not changed.

On the other hand, even when the distance L is equal to or less than the predetermined threshold Th, as shown in FIGS. 4 and 5, if the distance L does not change or if the distance L is changing in an increasing direction, the speed is not limited.

Figure 6:
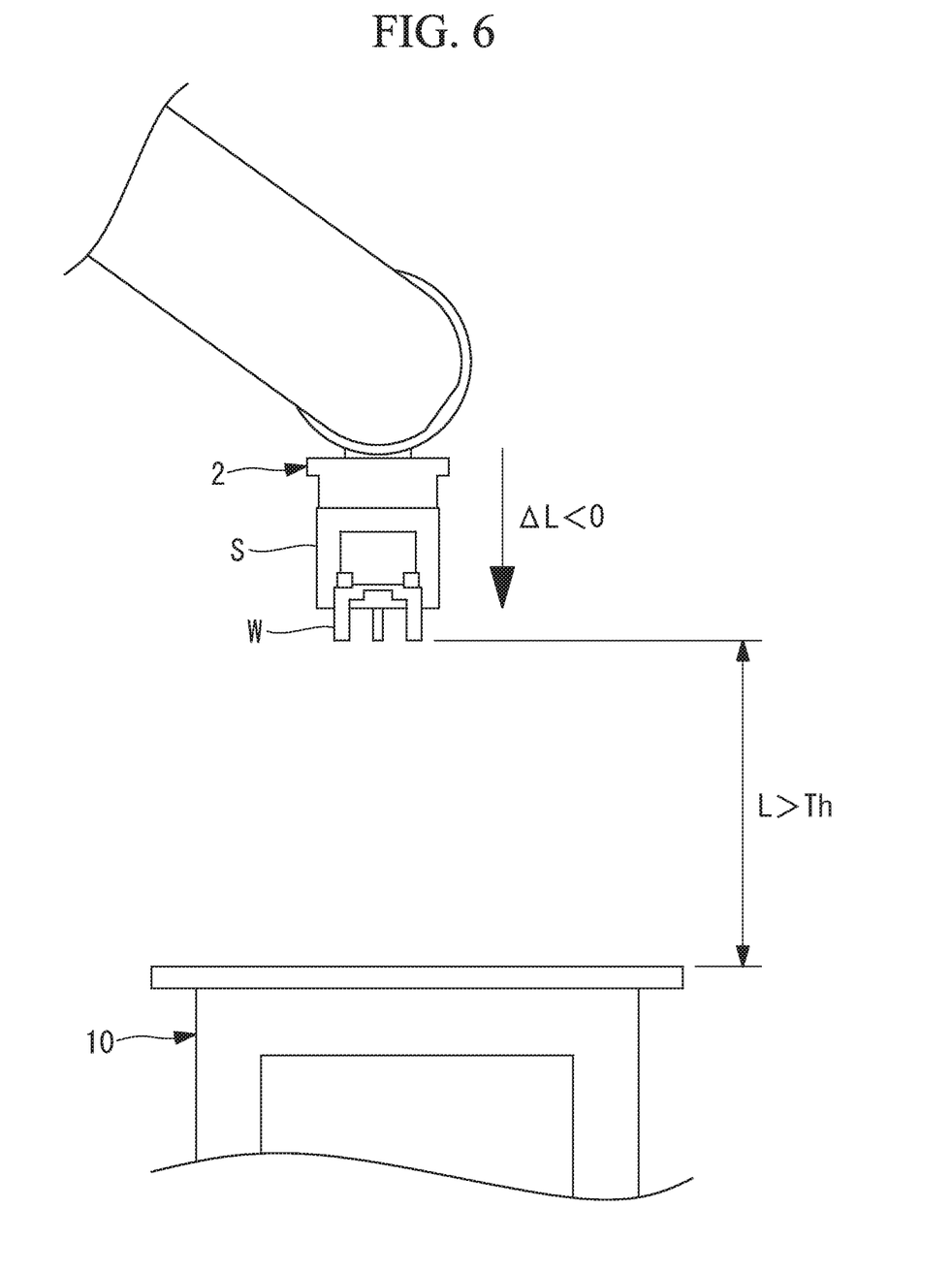
FIG. 6 is an enlarged front view of the robot system of FIG. 1 when the distance between the collaborative robot and the peripheral object is changing in a decreasing direction and is larger than a predetermined threshold.

Moreover, even when the distance L is changing in a decreasing direction, if the distance L is larger than the predetermined threshold Th as shown in FIG. 6, the speed is not limited.

Figure 7:
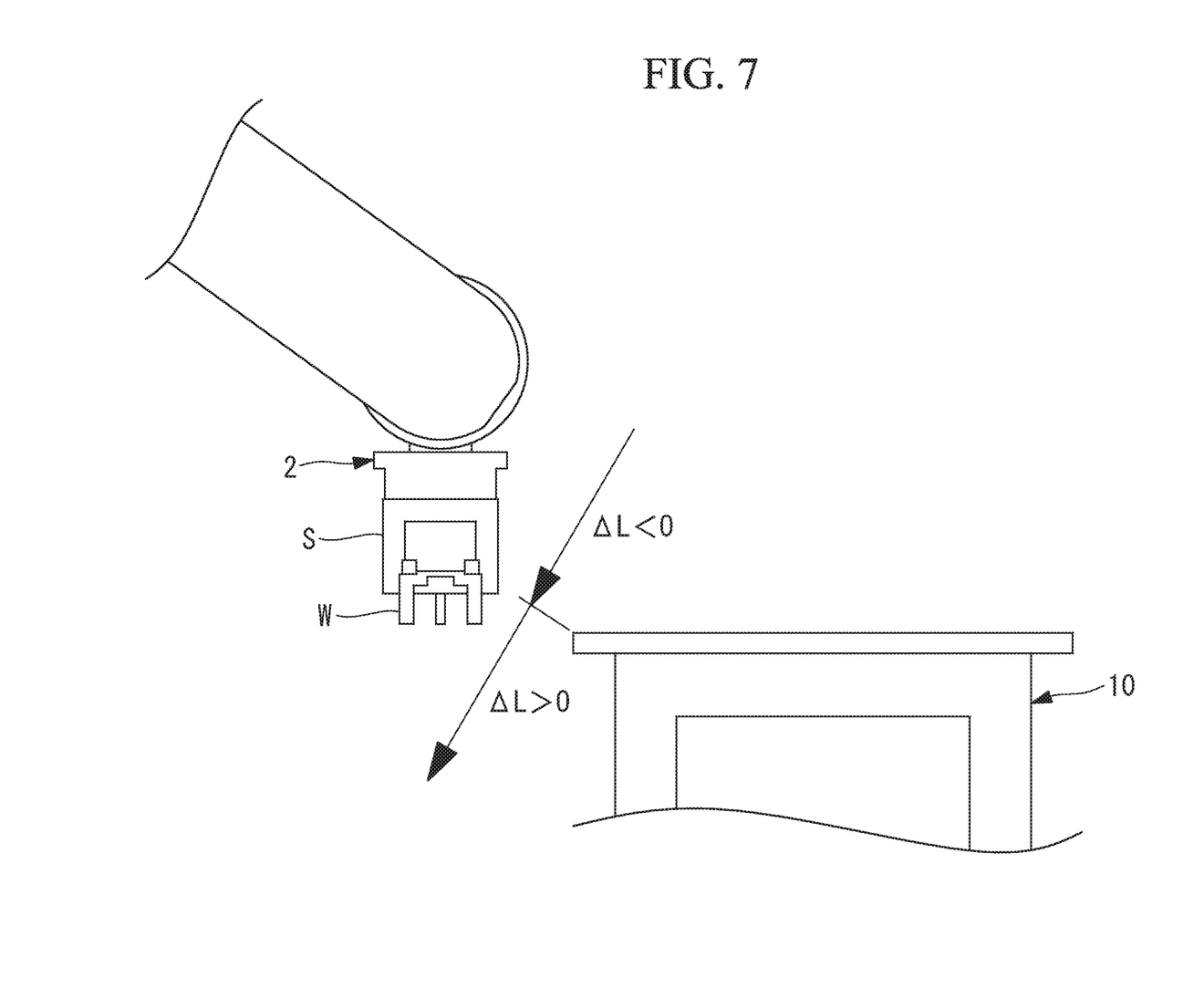
FIG. 7 is an enlarged front view of the robot system of FIG. 1 when the collaborative robot passes near the peripheral object.

Also, for example, as shown in FIG. 7, when the collaborative robot 1 passes near the peripheral object 10, in a phase where the collaborative robot 1 is approaching the peripheral object 10, the speed limit is raised according to the distance L, and then in a phase where the collaborative robot 1 has passed and is moving away from the peripheral object 10, the speed limit is canceled and the operating speed set in the teaching program is restored.

Hence, the control method of the collaborative robot 1 according to the present embodiment has such advantages that trapping is prevented by limiting the operating speed if the possibility of occurrence of trapping is high, and deterioration of operating efficiency can be prevented by avoiding unnecessary limits with respect to the operating speed if the possibility of occurrence of trapping is low.

That is, the operating speed is limited only when the collaborative robot 1 approaches the peripheral object 10, and the operating speed is not limited when the collaborative robot 1 moves away from the peripheral object 10. Moreover, even when the collaborative robot 1 approaches the peripheral object 10, if the distance L is large, the operating speed is not limited. Furthermore, even when the collaborative robot 1 has approached closer to the peripheral object 10 until the distance L is equal to or less than the predetermined threshold Th, the operating speed is limited more as the degree of closeness increases.

Particularly, in the present embodiment, since the shape information about the collaborative robot 1 and the peripheral object 10 is stored and a speed limit is automatically implemented based on the stored shape information, the operator does not need to set an operating speed according to the distance L between the collaborative robot 1 and the peripheral object 10 in a teaching operation of the collaborative robot 1. That is, the operator can perform the teaching operation without considering the distance L between the collaborative robot 1 and the peripheral object 10, thereby having advantages of simplifying the teaching operation and reducing the time required for teaching.

Moreover, in the present embodiment, since not only the shape information about the tool S but also the shape information about the collaborative robot 1 itself are taken into consideration, it is possible to surely prevent not only trapping between the tool S and the peripheral object 10, but also trapping between the collaborative robot 1 itself and the peripheral object 10. Further, when performing an operation in which the tool S or the collaborative robot 1 passes through a narrow space with respect to the peripheral object 10, even if the distance L between the tool S or the collaborative robot 1 and the peripheral object 10 is extremely short, the operating speed is not limited unless the distance L becomes shorter, thereby preventing deterioration in operating efficiency.

In the present embodiment, a speed limit is implemented according to the distance L between the tool S and the collaborative robot 1 itself and the peripheral object 10, and a change in the distance L, but a speed limit may be implemented depending only on the distance L between the tool S and the peripheral object 10, and a change in the distance L. By limiting the target of the determination of the distance L only to the tool S and the peripheral object 10, the amount of calculation can be reduced.

A speed limit is implemented according to the distance L between the collaborative robot 1 including the tool S and the peripheral object 10 and a change in the distance L, but a speed limit may be implemented depending only on a change in the distance L.

Further, in the present embodiment, the shape information to be stored in the storage unit 21 may include the hardness or the sharpness of each portion of at least one of the collaborative robot 1 and the peripheral object 10. Then, the processing unit 22 may relax the speed limit as the hardness or the sharpness of a portion where the distance L between the collaborative robot 1 and the peripheral object 10 is decreasing is smaller.

That is, if trapping occurs between portions having high hardness or high sharpness, the operator will receive considerable damage, but even if trapping occurs between portions having low hardness or low sharpness, the damage is likely small. Therefore, when at least one of the surface of the collaborative robot 1 and the surface of the peripheral object 10 is soft and is not pointed, it is possible to prevent an excessive decrease in the speed and to improve operating efficiency. On the contrary, when the surface of the collaborative robot 1 and the surface of the peripheral object 10 are hard or pointed, the damage to the operator can be reduced by sufficiently decreasing the speed.

In the present embodiment, a system that operates the collaborative robot 1 according to the teaching program is illustrated as the robot system 100, for example, but the system is not necessarily limited to this, and it is possible to adopt, for example, a system that causes the collaborative robot 1 to perform a jog operation. In this case, control is performed to decrease the speed of the jog operation only if the distance L calculated by the processing unit 22 is changing in a decreasing direction.

Moreover, in the present embodiment, the collaborative robot 1 may include a stopping means that causes a stop if an external force received by the collaborative robot 1 exceeds a reference value. In this case, if the external force received by the collaborative robot 1 exceeds the reference value, the collaborative robot is stopped by the stopping means of the collaborative robot 1. It is preferred to perform control to decrease the reference value for the external force received by the collaborative robot 1 only if the distance L calculated by the processing unit 22 is changing in a decreasing direction.

In the present embodiment, although an example in which the processing unit 22 calculates a change in the distance L between the collaborative robot 1 and the peripheral object 10 is described, a processing unit that calculates a change in the distance between portions of the collaborative robot 1 itself, including the tool S, may be adopted instead. Consequently, it is possible to prevent collision of component parts constituting the collaborative robot 1, for example, collision of the arms of the collaborative robot 1, or collision of the tool S with the base of the collaborative robot 1.

Further, the six-axis articulated type robot is described as an example of the collaborative robot 1, but the present invention is not limited to this, and can be applied to a robot system 100 having an arbitrary type of collaborative robot 1.

From the above-described embodiment, the following invention is derived.

One aspect of the present invention is a robot control method including: storing at least a part of shape information about a robot including a tool attached to a tip and about a peripheral object located on a periphery of the robot; calculating a change in a distance between the robot and the peripheral object, based on the shape information, at each operation position when operating the robot according to a teaching program; and performing control to decrease a speed set in the teaching program only if the calculated distance is changing in a decreasing direction.

According to this aspect, the shape information about a robot including a tool attached to the tip and about a peripheral object located on the periphery of the robot is stored; and a change in the distance between the robot and the peripheral object is calculated based on the stored shape information, at each operation position when operating the robot according to a teaching program. Control is performed so that the speed set in the teaching program is not decreased if the calculated distance is not changed or is changing in an increasing direction, and the speed set in the teaching program is decreased if the distance is changing in a decreasing direction. Hence, the risk can be reduced by decreasing the operating speed if there is a possibility that a part of the operator may be trapped between the robot including the tool and the peripheral object, and unnecessary deterioration in operating efficiency of the robot can be prevented by maintaining the operating speed if there is no risk of trapping.

Another aspect of the present invention is a robot control method including: storing at least a part of shape information about a robot including a tool attached to a tip and about a peripheral object located on a periphery of the robot; calculating a change in a distance between the robot and the peripheral object, based on the shape information, at each operation position when causing the robot to perform a jog operation; and performing control to decrease a speed of the jog operation only if the calculated distance is changing in a decreasing direction.

In the above-mentioned aspects, control may be performed to stop the robot if an external force received by the robot exceeds a reference value, and to decrease the reference value for the external force only if the calculated distance is changing in the decreasing direction.

Yet another aspect of the present invention is a robot control method including: storing at least a part of shape information about a robot including a tool attached to a tip; calculating a change in a distance between portions of the robot itself, based on the shape information, at each operation position when operating the robot according to a teaching program; and performing control to decrease a speed set in the teaching program only if the calculated distance is changing in a decreasing direction.

In the above-mentioned aspects, control may be performed to decrease the speed only if the distance between the robot and the peripheral object is smaller than a predetermined threshold.

With this configuration, if the calculated distance between the robot and the peripheral object is changing in a decreasing direction and is smaller than the predetermined threshold, the speed set in the teaching program is decreased. That is, in the case where the distance between the robot and the peripheral object is large, trapping will not occur even if the distance is changing in a decreasing direction, and therefore it is possible to avoid limiting the speed in such a case and prevent deterioration in operating efficiency.

Moreover, in the above-mentioned aspects, control may be performed to decrease the speed only if the distance between the tool and the peripheral object is changing in a decreasing direction.

With this configuration, if the calculated distance between the tool and the peripheral object is changing in a decreasing direction, the speed set in the teaching program is decreased.

Further, in the above-mentioned aspects, information about hardness or sharpness of each portion of at least one of the robot and the peripheral object may be stored, and the degree of decrease in the speed may be adjusted according to the hardness or the sharpness of the portion where the distance is changing in a decreasing direction.

With this configuration, even if the calculated distance between the robot and the peripheral object is changing in a decreasing direction, the degree of decrease in the speed set in the teaching program is adjusted according to the hardness or the sharpness of the portion of one of the robot and the peripheral object. That is, in the case where the hardness or the sharpness of a portion of at least one of the robot and the peripheral object moving in a direction approaching each other is sufficiently low, even if trapping occurs, damage to the operator is small, and therefore it is not necessary to significantly decrease the speed and it is possible to prevent deterioration in operating efficiency.

Furthermore, in the above-mentioned aspects, the higher the hardness of the portion, the more the degree of decrease in the speed may be raised.

With this configuration, even when the calculated distance between the tool and the peripheral object is changing in a decreasing direction, if the hardness of the portion of one of the robot and the peripheral object is low, it is possible to prevent deterioration of operating efficiency by reducing the degree of decrease in the speed.

In the above-mentioned aspects, the higher the sharpness of the portion, the more the degree of decrease in the speed may be raised.

With this configuration, even when the calculated distance between the robot and the peripheral object is changing in a decreasing direction, if the sharpness of the portion of one of the robot and the peripheral object is low, it is possible to prevent deterioration of operating efficiency by reducing the degree of decrease in the speed.

The invention claimed is:

1. A robot control method comprising:
   in a memory, storing shape information about a robot including a tool attached to a tip and about a peripheral object located on a periphery of the robot and storing a teaching program including a setting speed when operating the robot;
   by a processor connected to the memory, calculating a distance between the robot and the peripheral object, based on the shape information, at each operation position when operating the robot according to the teaching program;
   by the processor, determining whether or not the calculated distance is changing in a decreasing direction; and
   in response to determining that the calculated distance is changing in the decreasing direction, by the processor, operating the robot at a speed lower than the setting speed in the teaching program.

2. The robot control method according to claim 1, comprising:
   by the processor, stopping the robot if an external force received by the robot exceeds a reference value; and
   in response to determining that the calculated distance is changing in the decreasing direction, by the processor, decreasing the reference value for the external force.

3. The robot control method according to claim 1, wherein:
   in response to determining that the calculated distance is changing in the decreasing direction, by the processor, further determining whether or not the calculated distance is smaller than a predetermined threshold; and
   in response to determining that the calculated distance is smaller than the predetermined threshold, by the processor, operating the robot at a speed lower than the setting speed in the teaching program.

4. The robot control method according to claim 1, wherein in the calculating of the distance, by the processor, calculating a distance between the tool and the peripheral object.

5. The robot control method according to claim 1, comprising:
   in a memory, storing information about hardness or sharpness of each portion of the robot and the peripheral object; and
   by the processor, adjusting a degree of decrease in the speed, according to the hardness or the sharpness of the portion where the calculated distance is changing in the decreasing direction.

6. The robot control method according to claim 5, wherein the higher the hardness of the portion, the greater the degree of the decrease in the speed.

7. The robot control method according to claim 5, wherein the higher the sharpness of the portion, the greater the degree of the decrease in the speed.

8. A robot control method comprising:
   in a memory, storing shape information about a robot including a tool attached to a tip and about a peripheral object located on a periphery of the robot;
   by a processor connected to the memory, calculating a distance between the robot and the peripheral object, based on the shape information, at each operation position when causing the robot to perform a jog operation;
   by the processor, determining whether or not the calculated distance is changing in a decreasing direction; and
   in response to determining that the calculated distance is changing in the decreasing direction, by the processor, decreasing a speed of the jog operation.

9. A robot control method comprising:
   in a memory, storing shape information about a robot including a tool attached to a tip and storing a teaching program including a setting speed when operating the robot;
   by a processor connected to the memory, calculating a distance between portions of the robot itself, based on the shape information, at each operation position when operating the robot according to the teaching program;
   by the processor, determining whether or not the calculated distance is changing in a decreasing direction; and
   in response to determining that the calculated distance is changing in the decreasing direction, by the processor, operating the robot at a speed lower than the setting speed in the teaching program.

* * * * *